US010323532B2

(12) United States Patent
Kray et al.

(10) Patent No.: US 10,323,532 B2
(45) Date of Patent: Jun. 18, 2019

(54) FLOW DISCOURAGER AND METHOD OF MAKING SAME

(71) Applicant: GENERAL ELECTRIC COMPANY, Schenectady, NY (US)

(72) Inventors: Nicholas Joseph Kray, West Chester, OH (US); Narendra Digamber Joshi, Niskayuna, NY (US); Samar Jyoti Kalita, Cincinnati, OH (US); Paul Marsland, Cincinnati, OH (US); Wayne Spence, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 404 days.

(21) Appl. No.: 15/159,678

(22) Filed: May 19, 2016

(65) Prior Publication Data
US 2017/0335708 A1    Nov. 23, 2017

(51) Int. Cl.
*F01D 11/08*     (2006.01)
*F01D 11/12*     (2006.01)
*F16J 15/44*     (2006.01)
*F01D 11/02*     (2006.01)

(52) U.S. Cl.
CPC .............. *F01D 11/08* (2013.01); *F01D 11/02* (2013.01); *F01D 11/127* (2013.01); *F16J 15/444* (2013.01); *F05D 2240/125* (2013.01); *F05D 2250/283* (2013.01)

(58) Field of Classification Search
CPC ..................................................... F16J 15/444
See application file for complete search history.

(56) References Cited

U.S. PATENT DOCUMENTS

| 3,275,428 A | 9/1966 | Siegmund |
| 3,520,357 A * | 7/1970 | Bruner ................. E04C 2/3405 165/166 |
| 4,198,839 A * | 4/1980 | Linko, III ............... B23P 15/00 228/114 |
| 4,448,828 A | 5/1984 | Mochida et al. |
| 4,618,152 A | 10/1986 | Campbell |
| 4,774,121 A | 9/1988 | Vollenweider, II |
| 4,863,538 A | 9/1989 | Deckard |
| 4,906,508 A * | 3/1990 | Blankenburg ....... B29D 24/008 428/116 |
| 5,116,689 A | 5/1992 | Castro et al. |
| 5,160,248 A | 11/1992 | Clarke |
| 5,437,936 A * | 8/1995 | Johnson ................ B21D 47/00 428/593 |
| 5,460,758 A | 10/1995 | Langer et al. |
| 6,599,611 B1 | 7/2003 | Hall |

(Continued)

FOREIGN PATENT DOCUMENTS

DE  10 2011 102 598 A1  11/2012
WO  2015/130377 A2  9/2015

OTHER PUBLICATIONS

International Search Report and Written Opinion issued in connection with corresponding PCT Application No. PCT/US2017/026480 dated Jun. 20, 2017.

*Primary Examiner* — Jason D Shanske
*Assistant Examiner* — Brian O Peters
(74) *Attorney, Agent, or Firm* — Dority & Manning, P.A.

(57) ABSTRACT

The present disclosure generally relates to variable cellular structures, methods of making such cellular structures, and variable cellular flow discouragers for turbine engines for jet aircraft.

10 Claims, 7 Drawing Sheets

(56) References Cited

U.S. PATENT DOCUMENTS

| | | | |
|---|---|---|---|
| 7,938,224 B2 | 5/2011 | Frustie et al. | |
| 8,693,086 B2 | 4/2014 | Verschueren et al. | |
| 8,915,339 B2 * | 12/2014 | Kanous | A47C 27/18 |
| | | | 188/377 |
| 9,663,408 B2 * | 5/2017 | Kato | F01N 3/2828 |
| 9,889,347 B2 * | 2/2018 | Morales | A63B 53/04 |
| 2004/0048027 A1 | 3/2004 | Hayes et al. | |
| 2012/0163955 A1 | 6/2012 | Devi et al. | |
| 2015/0260294 A1 * | 9/2015 | Nakaniwa | F01D 11/02 |
| | | | 277/414 |
| 2016/0237836 A1 * | 8/2016 | Harris | F01D 25/12 |

\* cited by examiner

FLOW DISCOURAGER AND METHOD OF MAKING SAME

INTRODUCTION

The present disclosure generally relates to variable cellular structures, methods of making such cellular structures, and variable cellular flow discouragers for turbine engines for jet aircraft.

BACKGROUND

Honeycomb cellular structures are known and widely used in the aviation industry. For example, U.S. Patent App. No. 2004/0048027 to Hayes et al. discloses a honeycomb core product for use in the leading edges and ailerons for aircraft wings and airfoils. The honeycomb core product is positioned on the leading edge of wing and is covered by an outer skin member and attached to a structural support member. U.S. Patent App. No. 2004/0048027 is hereby incorporated by reference herein in its entirety.

Figure 1:
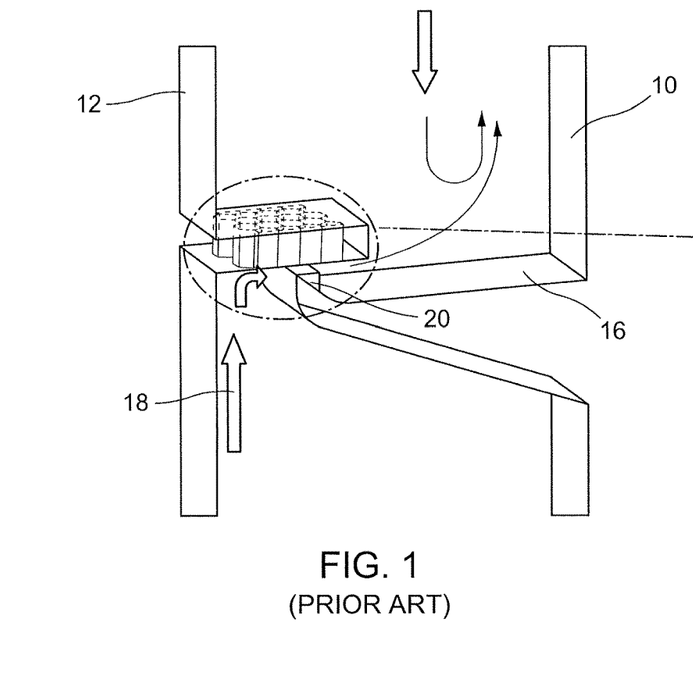
FIG. 1 is a side perspective view of the interface between a rotor tip and stator in a gas turbine engine.
Figure 2:
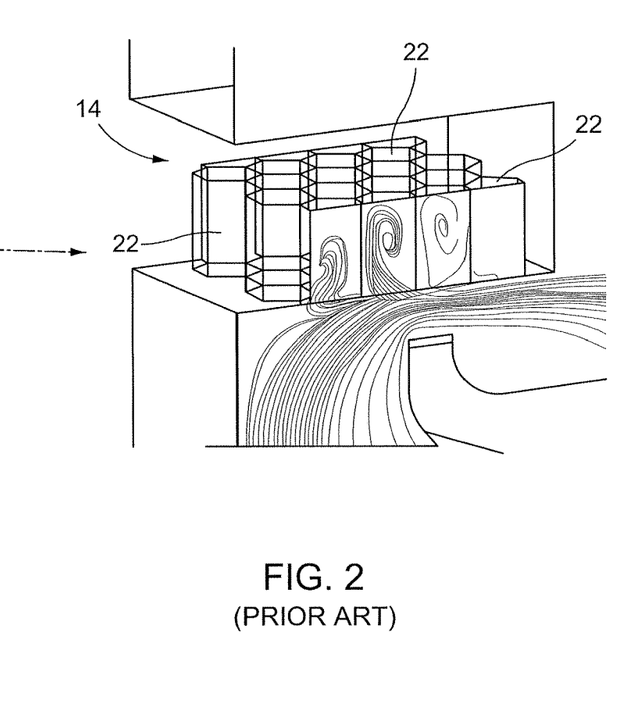
FIG. 2 is a close-up view of a conventional honeycomb-shaped flow discourager at the interface shown in FIG. 1.
Figure 3:
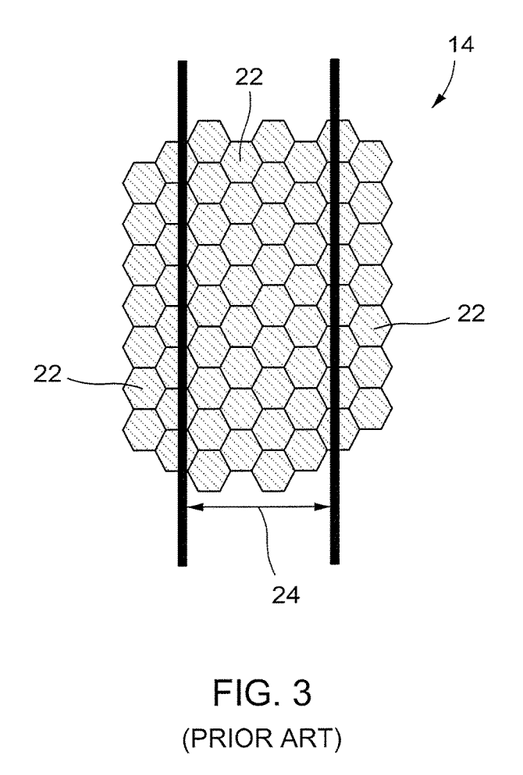
FIG. 3 is a top view conventional honeycomb flow discourager showing the rub path of the rotor tip.

Honeycomb structures have also been used as flow discouragers in gas turbine engines for jet aircrafts. For example, U.S. Patent App. No. 2012/0163955 to Devi et al. discloses a honeycomb-shaped flow discourager in a gas turbine. FIG. 1 illustrates a perspective view of the interface between a rotor 10 and stator 12 in a gas turbine engine. FIG. 2 illustrates a close up view of the interface shown FIG. 1, including a honeycomb-shaped flow discourager 14. The stator 12 remains stationary relative to the rotor 10, which turns due to the force of combustion gasses moving past the rotor vanes 16. A portion of the combustion gas 18 leaks through the interface between the rotor tip 20 and the stator 12, reducing the efficiency of the engine. To reduce leakage, a flow discourager 14 is placed at the interface between the stator 12 and the rotor tip 20 as shown in FIG. 2. The rotor tip 20 moves past a portion of the honeycomb structure 22 of the flow discourager 14 defining a rub path 24 as shown in FIG. 3. As shown in FIGS. 2 and 3, each of the honeycomb cells 22 have the same geometry including having the same relative wall thickness and contours. U.S. Patent App. No. 2012/0163955 is hereby incorporated by reference herein in its entirety.

SUMMARY

The following presents a simplified summary of one or more aspects of the invention in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

The disclosure provides a cellular structure, comprising a thickness dimension defined by cell walls and a surface plane defined by the edges of interconnecting cells, the surface plane comprising a first cellular region of the cells having a first maximum dimension in the surface plane, the surface plane comprising a second cellular region of the cells having a second maximum dimension in the surface plane, wherein the second dimension is less than the first dimension, and the cell walls of at least one of the first or second cellular regions having a non-linear contour or variable thickness.

In another aspect, the disclosure provides a turbine engine comprising a stator, a rotor, and an interface region between the stator and rotor and a flow discourager at the interface region. The flow discourage includes a cellular structure comprising a thickness dimension defined by cell walls and a surface plane defined by the edges of interconnecting cells, the surface plane comprising a first cellular region of the cells having a first maximum dimension in the surface plane, the surface plane comprising a second cellular region of the cells having a second maximum dimension in the surface plane, wherein the second dimension is less than the first dimension.

These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details.

Figure 4:
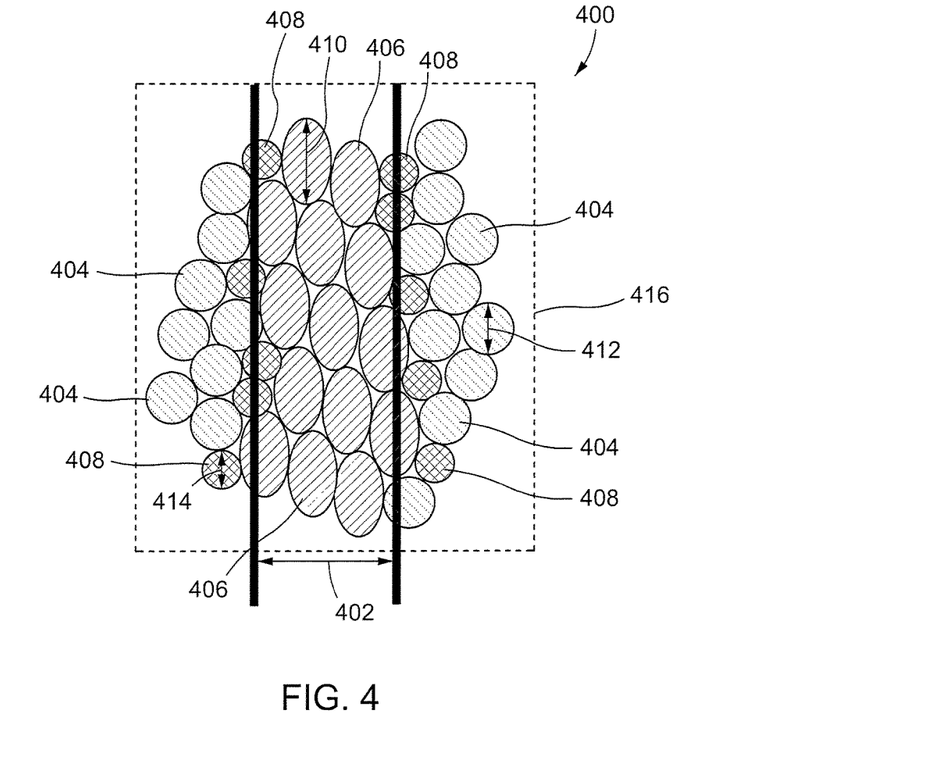
FIG. 4 is a top view of a schematic representation of a cellular structure of a flow discourager in accordance with aspects of the present invention.

FIG. 4 is a top view of a schematic representation of a cellular structure 400 that may be used as a flow discourager in a gas turbine engine. The cellular structure 400 comprises a plurality of cells having different geometries. The different cell geometries may define specific regions within the cellular structure 400, such as the rub path 402 shown in FIG. 4. The cellular structure 400 includes a plurality of first cells 404 having a first geometry and a plurality of second cells 406 having a second geometry. The cellular structure 400 may also include a plurality of third cells 408 having a third geometry and these third cells may be provided within a transition between cells of the first and second types.

Figure 5:
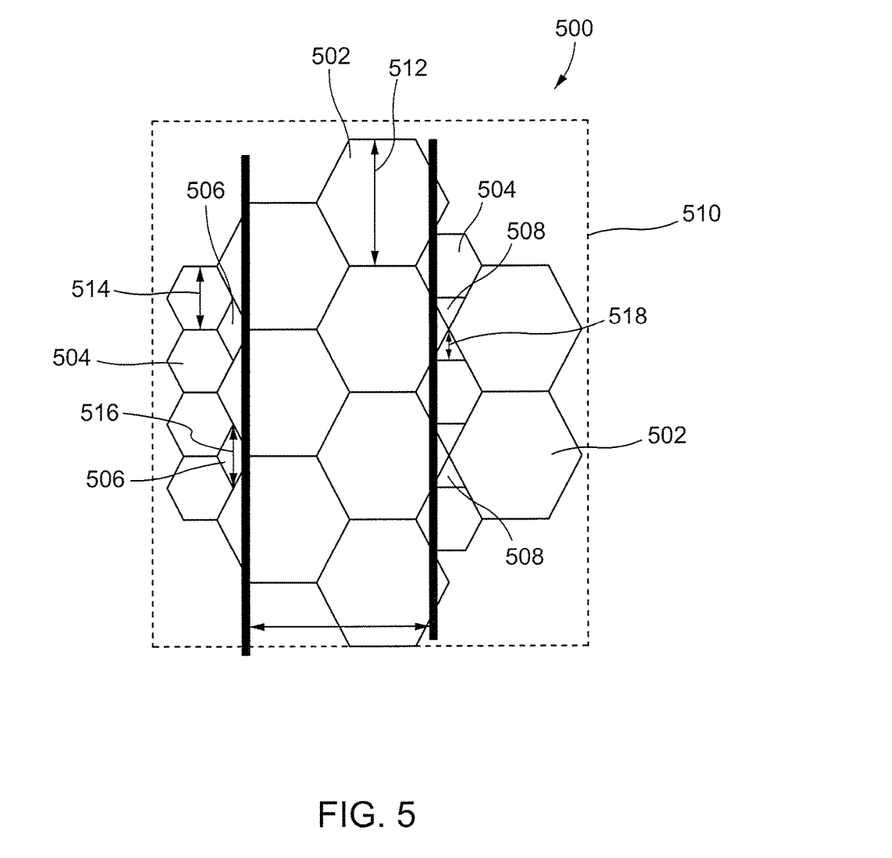
FIG. 5 is a top view of an alternate cellular structure of a flow discourager in accordance with aspects of the present invention.

Although the cells are depicted as spherical or elliptical, the geometry of each cell may vary as long as cells of different size are arranged as described herein. For example, the cells may be polygonal such as hexagons used in a honeycomb structure, but having different sizes so that the overall structure has different regions similar to as shown in FIG. 4. For example, FIG. 5 depicts a similar cellular structure as FIG. 4 but using a combination of hexagonal, diamond, and triangular shapes. In this example, the maximum diameter of the cells in the in the interior flow path region are larger than the cells outside and on both sides of the flow path. Smaller cells are found in the transition region between cells outside and inside the flow path region. FIG. 5 shows a plurality of cells having different geometries. The different cell geometries may define specific regions within the cellular structure 500, such as the rub path 502. The cellular structure 500 includes a plurality of first cells 502 having a first geometry and a plurality of second cells 504 having a second geometry. The cellular structure 500 may also include a plurality of third cells 506 having a third geometry and these third cells may be provided within a transition between cells of the first and second types or between cells the same type (e.g., between cells of the first type or between cells of the second type). The cellular structure may further include a plurality of cells 508 having a fourth geometry and these fourth cells may be provided within a transition between cells of the first, second, or third types or between cells the same type (e.g., between cells of the first type, between cells of the second type, or between cells of the third type).

The term "dimension" as used in this application can mean any like-dimension measurement that can be used to compare the relative size of cells. For example, where the cells 406 are elliptical in shape, the dimension is preferably the maximum diameter 410 as shown in FIG. 4. In this case, the second cells 406 have a dimension (i.e., maximum diameter) that is larger than the same geometry of first cells 404 and the third cells 408. In the case where all of the cells being compared are spherical (e.g., cells 404, 408), the diameter 412, 414 may be the geometry that is compared. For polygons (e.g., cells 502, 504, 506, 508), the geometry may be the maximum diameter but could also be a dimension of one of the portions of the polygon such as length of a side.

Figure 6:
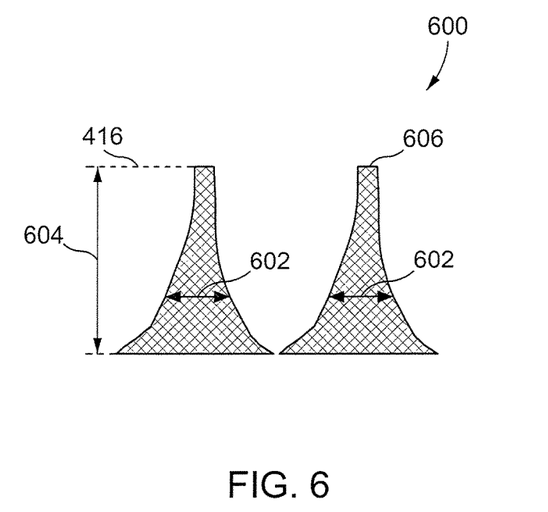
FIG. 6 is a cross sectional view of the first cell type shown in FIG. 4.
Figure 7:
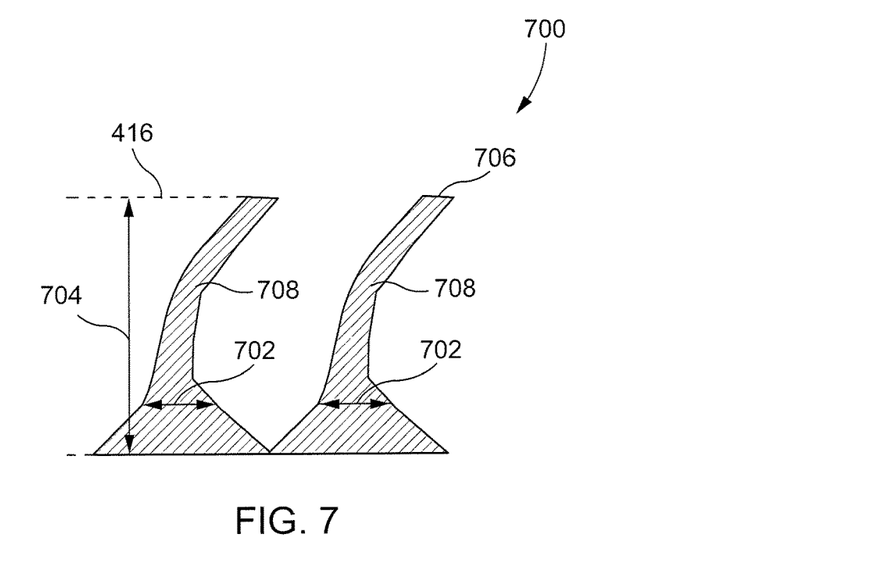
FIG. 7 is a cross sectional view of the second cell type shown in FIG. 4.
Figure 8:
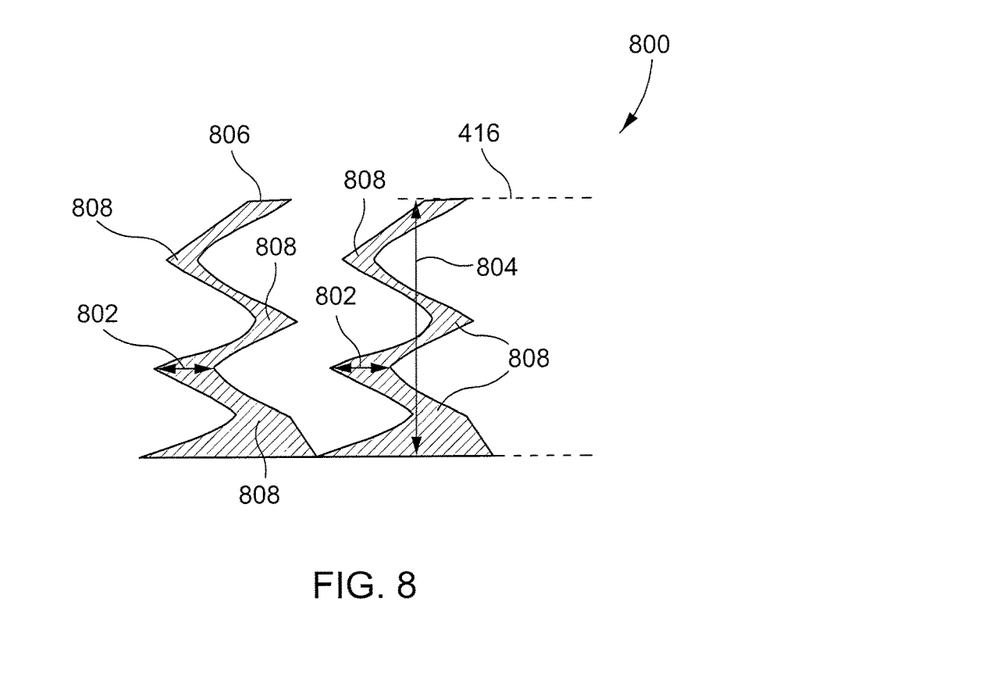
FIG. 8 is a cross sectional view of the third cell type shown in FIG. 4.

FIG. 6 shows a cross section of first example cell 600. FIG. 7 shows a cross section a second example cell 700. FIG. 8 shows a cross section of a wall thickness of a third example cell 800. As seen in FIGS. 6-8, each of the cells 600, 700, 800 comprises a thickness dimension 602, 702, 802, which may be varied along the height 604, 704, 804 of the cell wall, e.g., the thickness is variable. For instance, as shown, the thickness dimension 602, 702, 802 may taper from the bottom of the cell to a surface plane 416. Further, the cell wall may have a non-linear contour that may include one or more bends. For example, the cell 600 shown in FIG. 6 has a thickness 602 that gradually decreases non-linearly toward the top edges 606 of the cell. In the cell 700, shown in FIG. 7, the thickness 702 decreases nonlinearly toward the top edges 706 of the cell, but additionally includes a bend 708. In the cell 800, shown in FIG. 8, the thickness 802 decreases nonlinearly toward the top edges 806 of the cell, but additionally includes a plurality of bends 808 forming a zigzag pattern. While FIGS. 6-8 show several example cell cross section profiles, other profiles may be implemented such as other thickness contours and other types and number of bends. For example, there may be less or more bends than as illustrated (e.g., the cell wall may include 1, 2, 3, 4, 5, 6, or more bends) and the sharpness (e.g., the angle) of the bends may be smaller or greater than illustrated. In one aspect of the present invention, the cell walls of the second plurality of cells 406 may have more bends than the cell walls of the first plurality of cells 404.

In an aspect of the present invention, any of the cell contours may be combined as neighboring cells in any variety of combinations. For example, cell 600 may be connected with cell 700 and/or 800. Cell 700 may be connected with cell 600 and/or 800. Multiple cells 600 (e.g., 2, 3, 4, 5, etc.) may be connected together followed by one or multiple (e.g., 2, 3, 4, 5, etc.) of cells 700 and/or cells 800. Neighboring cells may alternate.

The cellular structure 400 has a thickness dimension 604, 704, 804 defined by the walls of the cells 600, 700, 800. In an aspect of the present invention, the thickness dimension is uniform across the cellular structure, e.g., each of the thickness dimensions 604, 704, 804 is the same. In another aspect thickness dimensions 604, 704, 704 may vary. The cellular structure 400 includes a surface plane 416 defined by the edges 606, 706, 806 of interconnecting cells. The surface plane 416 comprises a first cellular region of the cells having a first maximum dimension 410 (e.g., the region having the second plurality of cells 406) in the surface plane 416. The surface plane 416 comprises a second cellular region of the cells having a second maximum dimension 412 (e.g., the region having the first plurality of cells 404) in the surface plane 416. As shown in FIG. 4, the second dimension 412 may be less than the first dimension 410. The surface plane 416 may comprise a third cellular region of the cells having a third maximum dimension 414 (e.g., the region having the third plurality of cells 408) in the surface plane 416. The third maximum dimension 414 may be smaller than both the first maximum dimension 410 and the second maximum dimension 412.

In an aspect of the present invention, the third plurality of cells 408 (e.g., the cells having the third maximum dimension 414) may define a transition region between the first and second regions. For example, as shown in FIG. 4, the third plurality of cells 408 are interspersed between the first plurality of cells 404 and the second plurality of cells 406. By having the third plurality of cells 408 interspersed between the first plurality of cells 404 and second plurality of cells 406, a smooth transition region is provided. As shown in FIG. 4, there may be two transition regions such that the center of the cellular structure (e.g., the rub path 402) is formed of the second plurality of cells 406, with the center being surrounded by a transition region on opposing sides. As such, starting from one end of the cellular structure 400 and terminating on the opposing end (e.g., left side of the figure to the right side), the cell profile starts with the first plurality of cells 404, followed by the third plurality of cells 408, followed by the second plurality of cells 406, followed by the third plurality of cells 408, and terminating with the first plurality of cells 404.

In another aspect of the present invention, rather than having the third plurality of cells 408, the transition region may comprise the first plurality of cells 404 and the second plurality of cells 406 being interspersed. For example, starting from one end of the cellular structure and terminating on the opposing end, the cell profile starts with the first plurality of cells 404, followed by the first plurality of cells 404 and second plurality of cells 406 interspersed, followed by the second plurality of cells 406, followed by the first plurality of cells 404 and second plurality of cells 406 interspersed, and terminating with the first plurality of cells 404. The cellular structure may comprise a rub path 402 that interacts with the tip 20 of the rotor 10. As shown in FIG. 4, the rub path 402 may include primarily (e.g., greater than 90% of the cells, preferably greater than 95% of the cells, preferably greater than 99% of the cells) the second plurality of cells 406, and may also include some portion of the transition cells, e.g., the third plurality of cells 408. As also seen in FIG. 4, outside of the rub path 402, the cells are primarily (e.g., greater than 90% of the cells, preferably greater than 95% of the cells, preferably greater than 99% of the cells) the first plurality of cells 404 with some portion of the transition cells, e.g., the third plurality of cells 408. In an aspect of the present invention, the second plurality of cells 406 may have a relatively higher radial stiffness as compared to the first plurality of cells 404. This can be achieved by using cells configured with sufficient wall thickness and contour to achieve desired stiffness (e.g., cells 600, 700, 800). By primarily having cells with higher radial stiffness in rub path 402 and cells having lower radial stiffness outside the rub path 402, the cellular structure 400 is optimized for performance when interacting with the tip 20 of the rotor 10.

Similarly, the cellular structure 500 has a thickness dimension defined by the walls of the cells 502, 504, 506, 508. The cellular structure 500 includes a surface plane 510 defined by the edges of interconnecting cells. The surface plane 510 comprises a first cellular region of the cells having a first maximum dimension 512 (e.g., the region having the first plurality of cells 502) in the surface plane 510. The surface plane 510 comprises a second cellular region of the cells having a second maximum dimension 514 (e.g., the region having the second plurality of cells 504) in the surface plane 510. As shown in FIG. 5, the second dimension 514 may be less than the first dimension 512. The surface plane 510 may comprise a third cellular region of the cells having a third maximum dimension 516 (e.g., the region having the third plurality of cells 506) in the surface plane 510. The third maximum dimension 516 may be smaller than both the first maximum dimension 512 and the second maximum dimension 514. The surface plane 510 may comprise a fourth cellular region of the cells having a fourth maximum dimension 518 (e.g., the region having the fourth plurality of cells 508) in the surface plane 510. The fourth maximum dimension 518 may be smaller than all of the first maximum dimension 512 and the second maximum dimension 514, and the third maximum dimension 516. The cells of the cellular structure 500 may have the same wall structure as discussed herein with respect to the cellular structure 400, such as having the same wall profiles shown in FIGS. 6-8. Additionally, as shown in FIG. 5, the second plurality of cells 504 (e.g., the cells having the second maximum dimension 514) and/or the third plurality of cells 506 (e.g., the cells having the third maximum dimension 516) and/or the fourth plurality of cells 508 (e.g., the cells having the fourth maximum dimension 518) may define a transition region between other regions. For example, as shown in FIG. 5, the third plurality of cells 506 may be located between the first plurality of cells 502 and the second plurality of cells 504, while the second plurality of cells 504 and the fourth plurality of cells 508 may be located between the first plurality of cells 502. By having the second plurality of cells 504, the third plurality of cells 506, and/or the fourth plurality of cells 508 between the first plurality of cells 502 and second plurality of cells 504, a smooth transition region is provided. As shown in FIG. 5, there may be two transition regions such that the center of the cellular structure is formed of the first plurality of cells 502, with the center being surrounded by a transition region on opposing sides. As such, starting from one end of the cellular structure 500 and terminating on the opposing end (e.g., left to right of the figure), the cell profile begins with the second plurality of cells 504, followed by the third plurality of cells 506, followed by the first plurality of cells 502, followed by the second plurality of cells 504 and the fourth plurality of cells 508, and terminating with the first plurality of cells 502.

The cellular structure described herein may be used in place of the honeycomb structure 14, 22 shown in FIGS. 1 and 2. For example, the gas turbine in accordance with aspects of the present invention may include all of the elements shown in FIGS. 1 and 2, including a stator, a rotor, and an interface region between the stator and rotor.

The particular thickness and counters of the cell walls of a particular cell can be achieved through the use of additive manufacturing (AM) processes. AM processes generally involve the buildup of one or more materials to make a net or near net shape (NNS) object, in contrast to subtractive manufacturing methods. Though "additive manufacturing" is an industry standard term (ASTM F2792), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. A particular type of AM process uses an energy beam, for example, an electron beam or electromagnetic radiation such as a laser beam, to sinter or melt a powder material, creating a solid three-dimensional object in which particles of the powder material are bonded together. Different material systems, for example, engineering plastics, thermoplastic elastomers, metals, and ceramics are in use. Laser sintering or melting is a notable AM process for rapid fabrication of functional prototypes and tools. Applications include direct manufacturing of complex workpieces, patterns for investment casting, metal molds for injection molding and die casting, and molds and cores for sand casting. Fabrication of prototype objects to enhance communication and testing of concepts during the design cycle are other common usages of AM processes.

Selective laser sintering, direct laser sintering, selective laser melting, and direct laser melting are common industry terms used to refer to producing three-dimensional (3D) objects by using a laser beam to sinter or melt a fine powder. For example, U.S. Pat. Nos. 4,863,538 and 5,460,758 describe conventional laser sintering techniques. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate and the effects of processing parameters on the microstructural evolution during the layer manufacturing process have not been well understood. This method of fabrication is accompanied by multiple modes of heat, mass and momentum transfer, and chemical reactions that make the process very complex.

Figure 9:
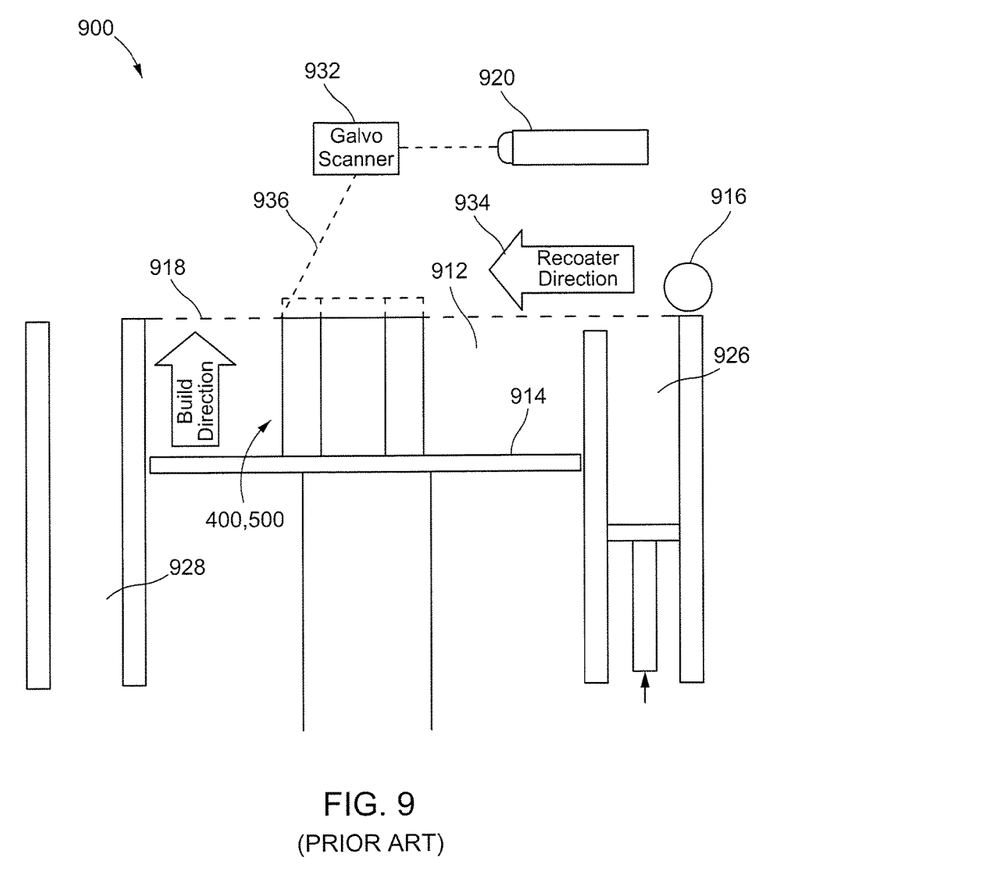
FIG. 9 is schematic representation showing an example apparatus for additive manufacturing of the cellular structure of FIG. 4.

FIG. 9 is schematic diagram showing a cross-sectional view of an exemplary conventional system 900 for direct metal laser sintering (DMLS) or direct metal laser melting (DMLM). The apparatus 900 builds objects, for example, the cellular structure 60, in a layer-by-layer manner by sintering or melting a powder material (not shown) using an energy beam 936 generated by a source such as a laser 920.

The powder to be melted by the energy beam is supplied by reservoir 926 and spread evenly over a build plate 914 using a recoater arm 916 travelling in direction 934 to maintain the powder at a level 918 and remove excess powder material extending above the powder level 918 to waste container 928. The energy beam 936 sinters or melts a cross sectional layer of the cellular structure under control of the galvo scanner 932. The build plate 914 is lowered and another layer of powder is spread over the build plate and object being built, followed by successive melting/sintering of the powder by the laser 920. The process is repeated until the cellular structure 400,500 is completely built up from the melted/sintered powder material. The laser 920 may be controlled by a computer system including a processor and a memory. The computer system may determine a scan pattern for each layer and control laser 920 to irradiate the powder material according to the scan pattern. After fabrication of the cellular structure 400,500 is complete, various post-processing procedures may be applied to the cellular structure 400,500. Post processing procedures include removal of access powder by, for example, blowing or vacuuming. Other post processing procedures include a stress release process. Additionally, thermal and chemical post processing procedures can be used to finish the cellular structure 400,500.

The AM process may use any suitable material to form the cellular structures 400, 500, and in particular materials useful for gas turbines. Example materials may be selected from the group consisting of steel, cobalt chromium, inconel, aluminum, and titanium. Thus, each cell of the formed cellular structure may comprise or consist of a material selected from the group consisting of steel, cobalt chromium, inconel, aluminum, and titanium.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

The invention claimed is:

1. A turbine engine comprising:
   a stator, a rotor, and an interface region between the stator and rotor; and
   a flow discourager at the interface region, the flow discourage including a cellular structure comprising:
      a thickness dimension defined by cell walls and a surface plane defined by the edges of interconnecting cells, wherein the rotor and stator define a rub path on the surface plane where a rotor tip of the rotor moves past the surface plane;
      the surface plane comprising a first cellular region of the cells having a first maximum dimension in the surface plane, wherein cells of the cellular structure defining the rub path include 90% or greater of the cells having the first maximum dimension;
      the surface plane comprising a second cellular region of the cells having a second maximum dimension in the surface plane, wherein the second dimension is less than the first dimension and wherein cells of the cellular structure outside the rub path include 90% or greater of the cells having the second maximum dimension.

2. The turbine engine of claim 1, wherein the surface plane comprises a transition region between the first cellular region and the second cellular region defined by cells in the transition region that have a third dimension that is less than the first or second dimension.

3. The turbine engine of claim 1, wherein the cell walls of at least one of the first or second cellular regions has a non-linear contour or variable thickness, and wherein the non-linear contour includes at least one bend.

4. The turbine engine of claim 3, wherein the non-linear contour includes three or more bends.

5. The turbine engine of claim 3, wherein the variable thickness includes a taper from the bottom of the cell to the surface plane.

6. The turbine engine of claim 1, wherein the first cellular region includes cells with two or more bends in the cell walls.

7. The turbine engine of claim 6, wherein the second cellular region includes cells with less bends in the cell walls than the cells in the first cellular region.

8. The turbine engine of claim 1, wherein the surface plane comprises a transition region between the first cellular region and the second cellular region, wherein the transition region comprises cells having the first maximum dimension interspersed with cells having the second maximum dimension.

9. The turbine engine of claim 1, wherein the first cellular region is sandwiched between two portions of the second cellular region.

10. The turbine engine of claim 1, wherein each of the cells comprise a material selected from the group consisting of steel, cobalt chromium, inconel, aluminum, and titanium.

* * * * *